US012687508B2

(12) United States Patent (10) Patent No.: US 12,687,508 B2
Suzuki (45) Date of Patent: Jul. 21, 2026

(54) X-RAY FLUORESCENCE SPECTROMETER

(71) Applicant: SHIMADZU CORPORATION, Kyoto (JP)

(72) Inventor: Keijiro Suzuki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 136 days.

(21) Appl. No.: 18/858,747

(22) PCT Filed: Feb. 24, 2023

(86) PCT No.: PCT/JP2023/006692
§ 371 (c)(1),
(2) Date: Oct. 22, 2024

(87) PCT Pub. No.: WO2023/210136
PCT Pub. Date: Nov. 2, 2023

(65) Prior Publication Data
US 2025/0290876 A1 Sep. 18, 2025

(30) Foreign Application Priority Data
Apr. 28, 2022 (JP) ................................. 2022-074489

(51) Int. Cl.
*G01N 23/00* (2006.01)
*G01N 23/223* (2006.01)
(52) U.S. Cl.
CPC ..... *G01N 23/223* (2013.01); *G01N 2223/303* (2013.01)
(58) Field of Classification Search
CPC ........................ G01N 2223/303; G01N 23/223
See application file for complete search history.

(56) References Cited

U.S. PATENT DOCUMENTS 6,324,251 B1 11/2001 Kuwabara
6,496,562 B1 * 12/2002 Henrich ............... G01N 23/223
378/90
(Continued)

FOREIGN PATENT DOCUMENTS

JP 2000-193615 A 7/2000
JP 2000-227403 A 8/2000
(Continued)

OTHER PUBLICATIONS

PCT written opinion for PCT/JP2023/006692 dated Apr. 18, 2023.
Japanese Notice of Reasons for Refusal dated Dec. 16, 2025.

*Primary Examiner* — Dani Fox
(74) *Attorney, Agent, or Firm* — Yokoi & Co., U.S.A.; Toshiyuki Yokoi

(57) ABSTRACT

An X-ray fluorescence spectrometer includes: a sample stage; an X-ray tube that radiates excitation X-rays toward the sample stage; a detector that detects fluorescent X-rays emitted from a sample on the sample stage; and a control device that controls the X-ray tube and the detector. Assuming that an intensity of X-rays that are part of the fluorescent X-rays, of a material of an X-ray tube target, emitted from the X-ray tube and are Rayleigh scattered by the sample placed on the sample stage is defined as IR and that an intensity of X-rays that are Compton scattered is defined as IC, when the control device creates a calibration curve by irradiating the standard sample with the excitation X-rays from the X-ray tube and when a value of IR/IC obtained for the standard sample is out of a reference range, the control device issues a warning.

5 Claims, 8 Drawing Sheets

(56)     References Cited

U.S. PATENT DOCUMENTS

2019/0227009  A1      7/2019   Furukawa
2023/0358695  A1     11/2023   Terborg

FOREIGN PATENT DOCUMENTS

| JP | 2003-28816 | A | 1/2003 |
| JP | 2008-275454 | A | 11/2008 |
| JP | 2013-40867 | A | 2/2013 |
| JP | 2015-94643 | A | 5/2015 |
| JP | 2017-20924 | A | 1/2017 |
| JP | 6507898 | B | 5/2019 |
| JP | 6683111 | B | 4/2020 |
| KR | 10-2005-0112376 | A | 11/2005 |
| WO | 2015/056305 | A | 4/2015 |

* cited by examiner

FIG.5

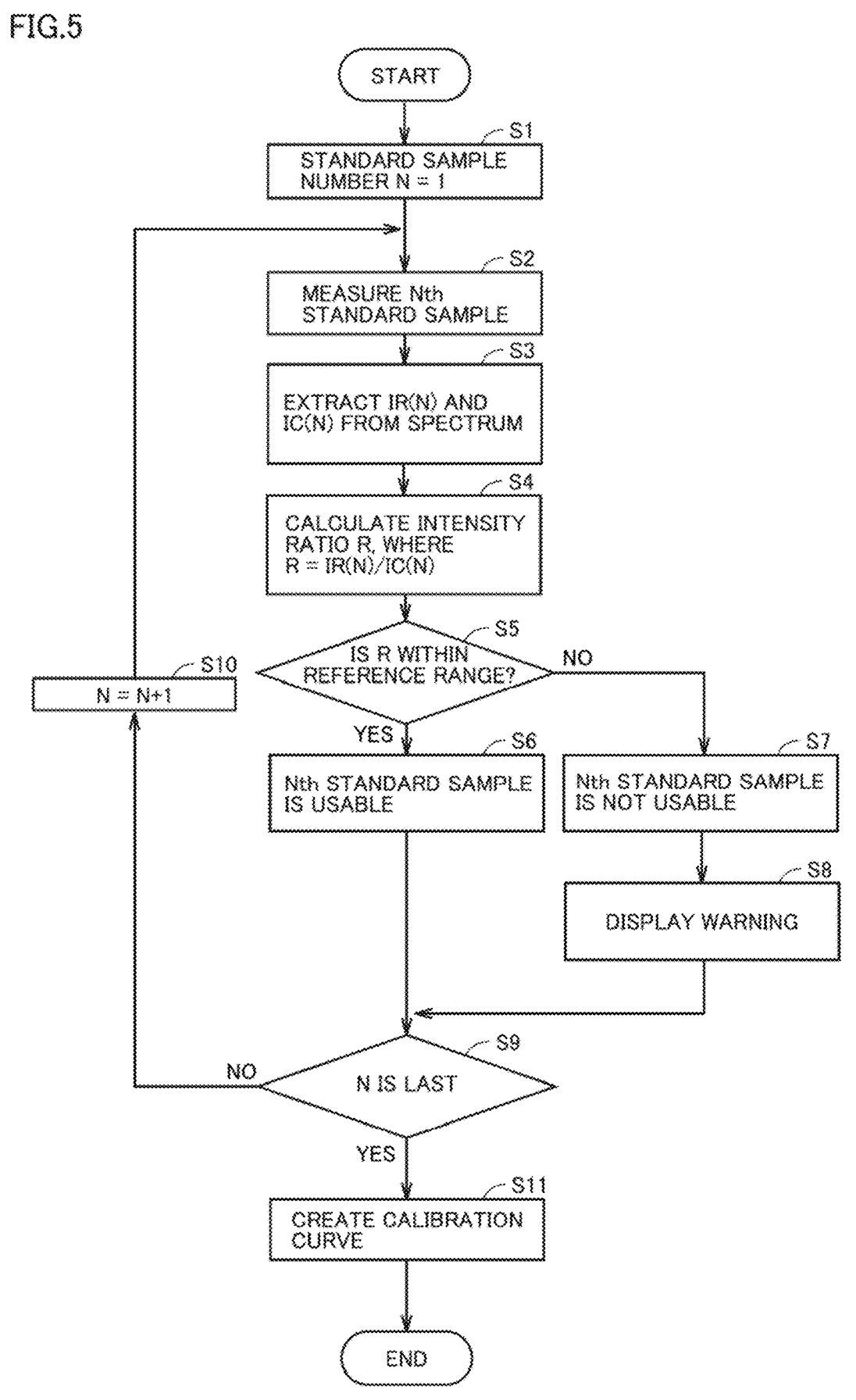

START

S1
STANDARD SAMPLE
NUMBER N = 1

S2
MEASURE Nth
STANDARD SAMPLE

S3
EXTRACT IR(N) AND
IC(N) FROM SPECTRUM

S4
CALCULATE INTENSITY
RATIO R, WHERE
R = IR(N)/IC(N)

S5
IS R WITHIN
REFERENCE RANGE?

S10
N = N+1

YES
S6
Nth STANDARD SAMPLE
IS USABLE

NO
S7
Nth STANDARD SAMPLE
IS NOT USABLE

S8
DISPLAY WARNING

S9
N IS LAST

NO

YES

S11
CREATE CALIBRATION
CURVE

END

FIG.7

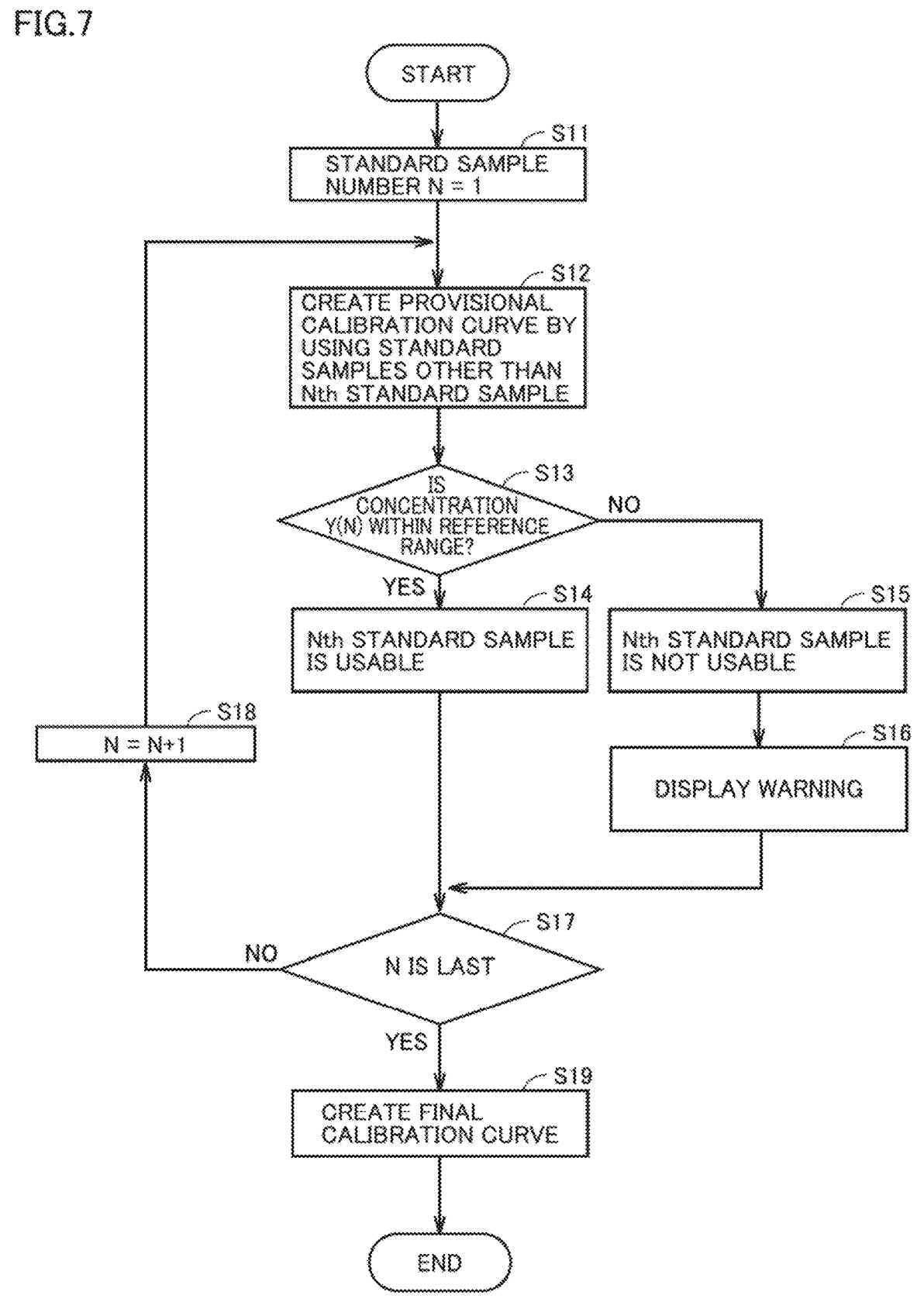

START

S11
STANDARD SAMPLE
NUMBER N = 1

S12
CREATE PROVISIONAL
CALIBRATION CURVE BY
USING STANDARD
SAMPLES OTHER THAN
Nth STANDARD SAMPLE

S13
IS
CONCENTRATION
Y(N) WITHIN REFERENCE
RANGE?

NO

YES

S14
Nth STANDARD SAMPLE
IS USABLE

S15
Nth STANDARD SAMPLE
IS NOT USABLE

S16
DISPLAY WARNING

S18
N = N+1

S17
N IS LAST

NO

YES

S19
CREATE FINAL
CALIBRATION CURVE

END

X-RAY FLUORESCENCE SPECTROMETER

TECHNICAL FIELD

The present disclosure relates to an X-ray fluorescence spectrometer.

BACKGROUND ART

The X-ray fluorescent spectroscopy is an analysis method of analyzing constituent elements of a sample by irradiating a sample with X-rays and measuring fluorescent X-rays emitted from the sample.

For example, in the X-ray fluorescence spectrometer disclosed in Japanese Patent Laying-Open No. 2015-94643 (PTL 1), there is used a "calibration curve" obtained by previously measuring, using a standard sample S, a relation between a "concentration D of element" and a "fluorescent X-ray intensity I per an excitation X-ray intensity Iex". With the calibration curve, the intensity of the fluorescent X-ray emitted from an unknown sample can be converted into a concentration of a detected component in the unknown sample.

CITATION LIST

Patent Literature

PTL 1: Japanese Patent Laying-Open No. 2015-94643

SUMMARY OF INVENTION

Technical Problem

The calibration curve is created by measuring the fluorescent X-ray intensity Ia per tube current, using standard samples each containing an element of 'a' having a known concentration or content (hereinafter, described representatively as concentration) Da. The number of standard samples may be one, but in many cases a plurality of standard samples having different concentrations Da are used.

However, in a case where a calibration curve is created by the X-ray fluorescence spectrometer by using a plurality of standard samples, if a user erroneously sets, in the spectrometer, a sample different from a standard sample that should be used, an erroneous calibration curve is created, so that a large error will be contained in a quantitative value of an unknown sample obtained using the calibration curve. In addition, in a case where a base material used for the calibration curve is different from a base material of the unknown sample, the quantitative result contains a larger error.

An object of the present disclosure is to provide an X-ray fluorescence spectrometer with which it is possible, in the case of using a calibration curve, to detect that a sample is not appropriate and to suppress a measurement error.

Solution to Problem

A first aspect of the present disclosure relates to an X-ray fluorescence spectrometer that analyzes a constituent element of a sample. An X-ray fluorescence spectrometer includes: a sample stage on which the sample is placed; an X-ray tube including a target that emits X-rays when receiving thermal electrons, the X-ray tube radiating, toward the sample stage, excitation X-rays containing fluorescent X-rays of a material of the target; and a detector that detects fluorescent X-rays emitted from the sample on the sample stage; and a control device that controls the X-ray tube and the detector. An intensity of X-rays that are part of the fluorescent X-rays from the target material and are Rayleigh scattered by the sample placed on the sample stage is defined as IR, an intensity of X-rays that are part of the fluorescent X-rays from the target material and are Compton scattered by the sample placed on the sample stage is defined as IC, and the control device is configured to issue a warning, when the control device creates a calibration curve by irradiating the standard sample with the excitation X-rays from the X-ray tube and when a value of IR/IC obtained for the standard sample is out of a first reference range.

Advantageous Effects of Invention

When the calibration curve is created, the X-ray fluorescence spectrometer of the present disclosure detects that the selection of the sample is not appropriate and notifies the user that the selection of the sample is not appropriate, it is possible to avoid a situation in which a measurement error is enlarged.

BRIEF DESCRIPTION OF DRAWINGS

FIG. 5 is a flowchart for describing a process, for creating a calibration curve, performed by the control device in a first embodiment.

FIG. 7 is a flowchart for describing a process, for creating a calibration curve, performed by the control device in a second embodiment.

DESCRIPTION OF EMBODIMENTS

Figure 1:
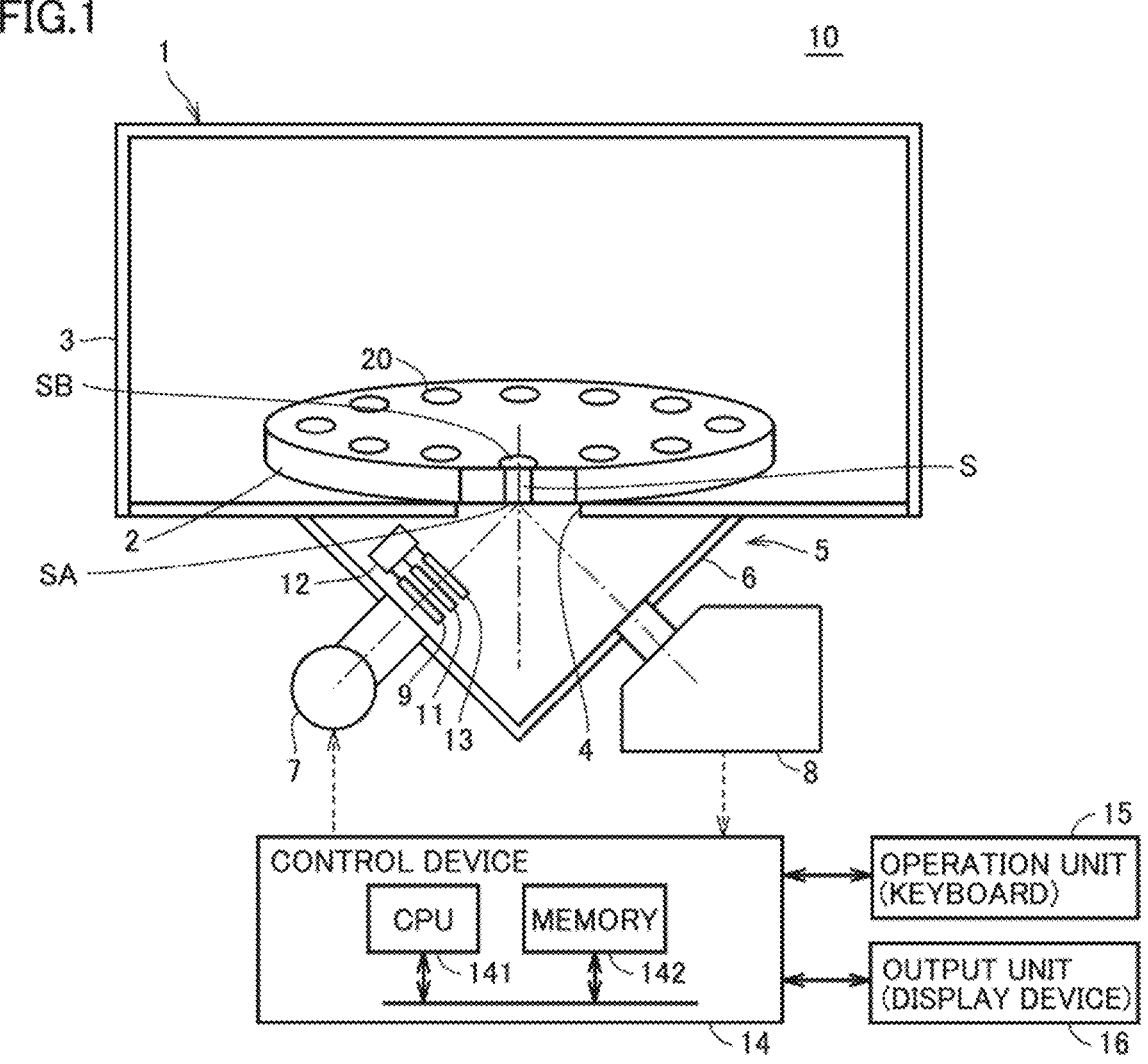
FIG. 1 is a diagram schematically illustrating an overall configuration of an X-ray fluorescence spectrometer.

With reference to the drawings, hereinafter, an embodiment will be described in detail. In the drawings, the same or corresponding parts are denoted by the same reference signs, and the description thereof will not be repeated.

First Embodiment

FIG. 1 is a diagram schematically illustrating an overall configuration of an X-ray fluorescence spectrometer. An X-ray fluorescence spectrometer 10 illustrated in FIG. 1 includes a sample chamber 1, a measurement chamber 5, a control device 14, an operation unit 15, and an output unit 16.

X-ray fluorescence spectrometer 10 is an energy dispersive type X-ray fluorescence spectrometer (EDX) that measures a concentration of an element contained in a sample S. Sample chamber 1 and a space inside measurement chamber 5 are airtightly enclosed by a housing 3, and an inside thereof can be kept in a vacuum state as necessary.

Sample chamber 1 includes a sample stage 2 on which a plurality of samples S can be arranged at the bottom part. Sample stage 2 has a plurality of (for example, 12) opening portions 20 on which samples S are placed. Samples S are placed on sample stage 2 so as to cover opening portions 20. Such sample stage 2 can switch samples S to be analyzed when rotated, and is called a turret. Each sample S has a front surface SA on which there is a measurement position, and has a back surface SB located on a side opposite to front surface SA. At the time of measurement, a rotational position of 10 sample stage 2 is determined such that the measurement position on front surface SA of one of samples S is exposed from an opening portion 4 at a bottom portion of housing 3.

On a wall surface 6 of measurement chamber 5, there are provided an X-ray tube 7 and a detector 8. X-ray tube 7 radiates primary X-rays toward sample S. The primary X-rays emitted from X-ray tube 7 are applied to the measurement position of sample S through opening portion 4. Secondary X-rays (fluorescent X-rays) emitted from sample S are incident on detector 8, and energy and intensity of the fluorescent X-rays are measured.

In measurement chamber 5, there are installed a shutter 9, a primary X-ray filter 11, and a collimator 13. Shutter 9, primary X-ray filter 11, and collimator 13 are configured to be slidable in a direction perpendicular to a paper surface of FIG. 1 by a drive mechanism 12.

Shutter 9 is formed of an X-ray absorbing material such as lead, and can be inserted into an optical path of the primary X-rays to block the primary X-rays when necessary.

Primary X-ray filter 11 is formed of a metal foil selected in accordance with a purpose and attenuates a background component of the primary X-rays emitted from X-ray tube 7 to improve S/N ratios of required characteristic X-rays. In an actual device, a plurality of primary X-ray filters 11 made of mutually different kinds of metals are used, and primary X-ray filters 11 selected in accordance with a purpose are inserted into the optical path of the primary X-rays by drive mechanism 12.

Collimator 13 is an aperture having a circular opening in a center thereof, and determines a beam size of the primary X-rays with which sample S is irradiated. Collimator 13 is formed of an X-ray absorbing material such as lead or brass. In an actual device, a plurality of collimators 13 having different opening diameters are arranged side by side in a direction perpendicular to the paper surface of FIG. 1, and collimator 13 selected in accordance with a purpose is inserted on a primary X-ray beam line by drive mechanism 12.

Control device 14 is configured mainly with a central processing unit (CPU) 141 that is an arithmetic processing unit. As control device 14, a personal computer can be used, for example. X-ray tube 7, detector 8, and output unit 16 are connected to control device 14.

Control device 14 controls measurement performed by X-ray fluorescence spectrometer 10 on the basis of a measurement condition that is input by operation unit 15 including a keyboard, a mouse, and the like. Specifically, control device 14 controls a tube voltage, a tube current, an irradiation time, and the like in X-ray tube 7, and drives each of shutter 9, primary X-ray filter 11, and collimator 13 by drive mechanism 12. Note that operation unit 15 may be a touch panel or the like integrally configured with a display screen of a display device.

Control device 14 also acquires data of the secondary X-rays detected by detector 8. Control device 14 performs a quantitative analysis of each element on the basis of the spectrum of the secondary X-rays detected by detector 8.

Output unit 16 includes a display device including, for example, a liquid crystal display (LCD) or an organic electro luminescence (EL). The display device displays an image based on the data transmitted from control device 14. The display device can display various images created by control device 14. The display device can also display an analysis result created by control device 14, together with identification information (product name, product number, measurement position, and the like) for identifying sample S.

Control device 14 includes CPU 141 and a memory 142 that stores a program and data. Memory 142 includes a read only memory (ROM), a random access memory (RAM), and a solid state drive (SSD). Instead of the SSD, a hard disk drive (HDD) may be included.

The ROM stores a program to be executed by CPU 141. The RAM temporarily stores data used during execution of the program on CPU 141, and functions as a temporary data memory used as a work area. The SSD is a nonvolatile storage device, and stores a measurement result by X-ray fluorescence spectrometer 10.

Figure 2:
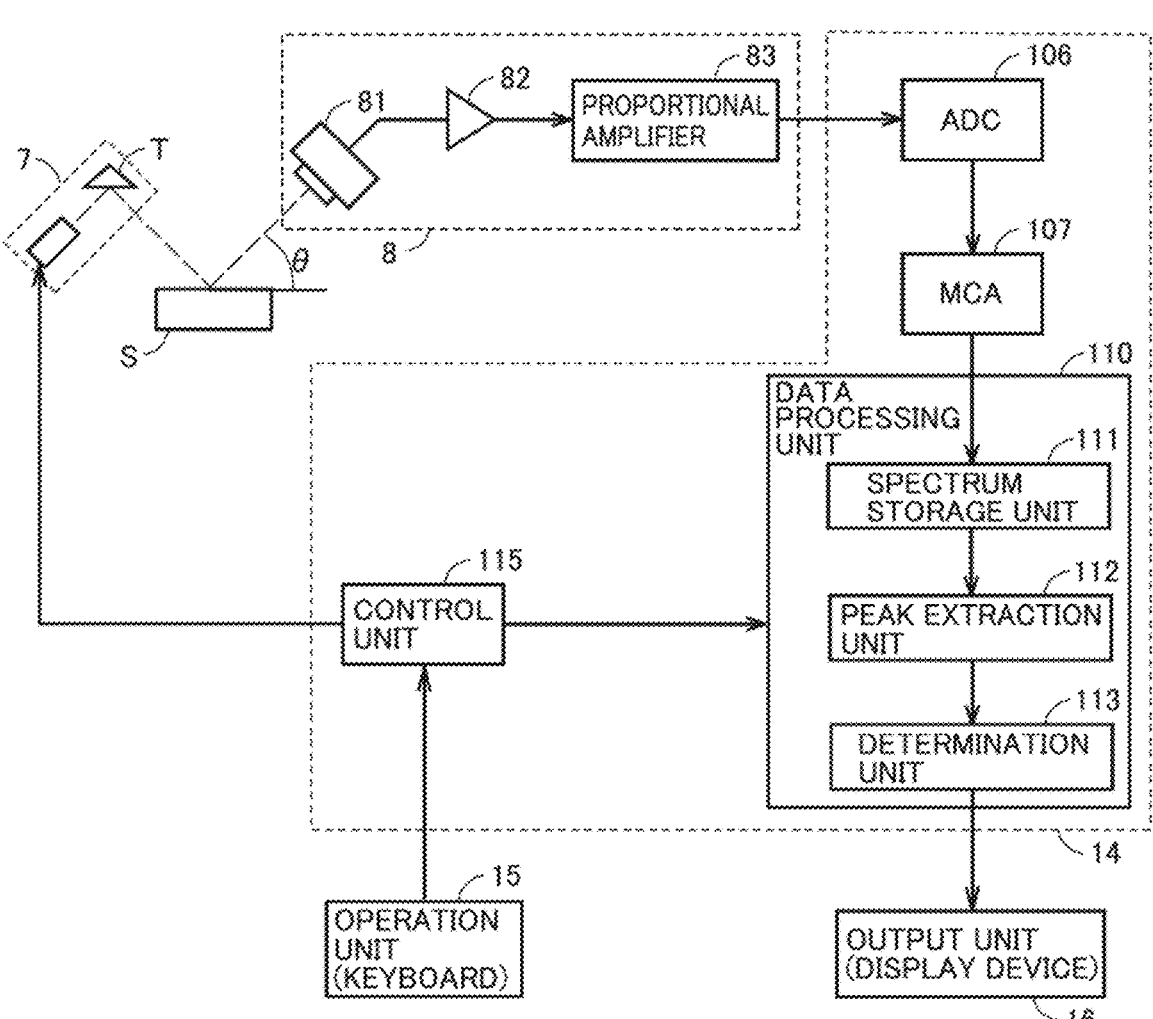
FIG. 2 is a functional block diagram of a detector 8 and a control device 14.

FIG. 2 is a functional block diagram of detector 8 and control device 14. By executing the program, CPU 141 performs an operation of each functional block of control device 14 in FIG. 2.

Detector 8 includes an X-ray detector 81, a pre-amplifier 82, and a proportional amplifier 83. Control device 14 includes an A/D converter (ADC) 106, a multichannel analyzer (MCA) 107, a data processing unit 110, and a control unit 115. Data processing unit 110 includes a spectrum storage unit 111, a peak extraction unit 112, and a determination unit 113.

X-ray tube 7 includes: a filament that emits thermal electrons; and a target T that converts the thermal electrons into predetermined primary X-rays and emits the primary X-rays. As target T, a metal such as rhodium is used. Control unit 115 controls a tube voltage of the X-ray tube in order to adjust an X-ray intensity.

When the primary X-rays (excitation X-rays) emitted from X-ray tube 7 are applied to sample S, the secondary X-rays (including fluorescent X-rays of sample S) excited by the primary X-rays are emitted from sample S and are incident on X-ray detector 81 such as a silicon drift detector, and the incident secondary X-rays are detected as a current signal. Furthermore, part of the excitation X-rays that is applied to sample S is scattered by sample S, and such scattered X-rays are also detected by X-ray detector 81.

The detected current is integrated inside X-ray detector 81, and a value of the integral is reset when a certain time has elapsed. As a result, an output signal of X-ray detector 81 becomes a step-shaped current pulse signal. A height of each step of the signal corresponds to an energy of each element included in sample S. The current pulse signal is input to pre-amplifier 82 and proportional amplifier 83 including a waveform shaping circuit and is formed into a pulse having an appropriate shape having a wave height corresponding to the height of each step before being output.

A/D converter (ADC) 106 samples and digitizes the analog signal having a pulse waveform, at a predetermined sampling period. Multichannel analyzer (MCA) 107 discriminates the pulses into various energy ranges on the basis of peak height values of the digitized pulses, then counts the discriminated pulses, and creates a wave height distribution diagram, in other words, an X-ray spectrum, then inputs the X-ray spectrum to data processing unit 110. Data constituting the X-ray spectrum is stored in spectrum storage unit 111.

Figure 3:
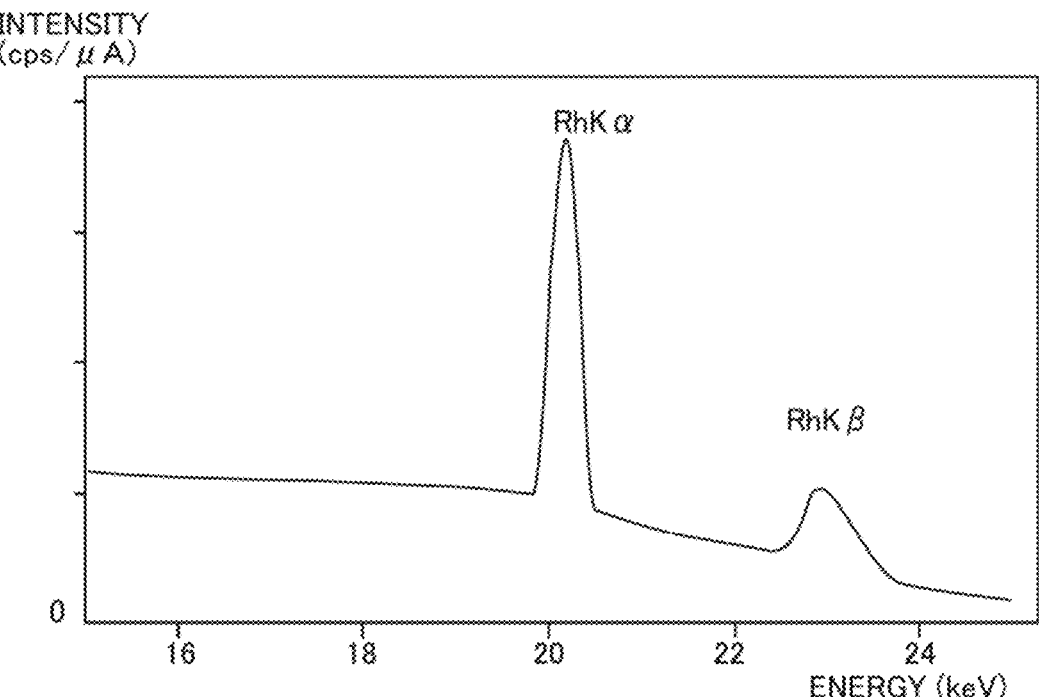
FIG. 3 is a diagram illustrating an X-ray spectrum of excitation X-rays emitted from an X-ray tube.
Figure 4:
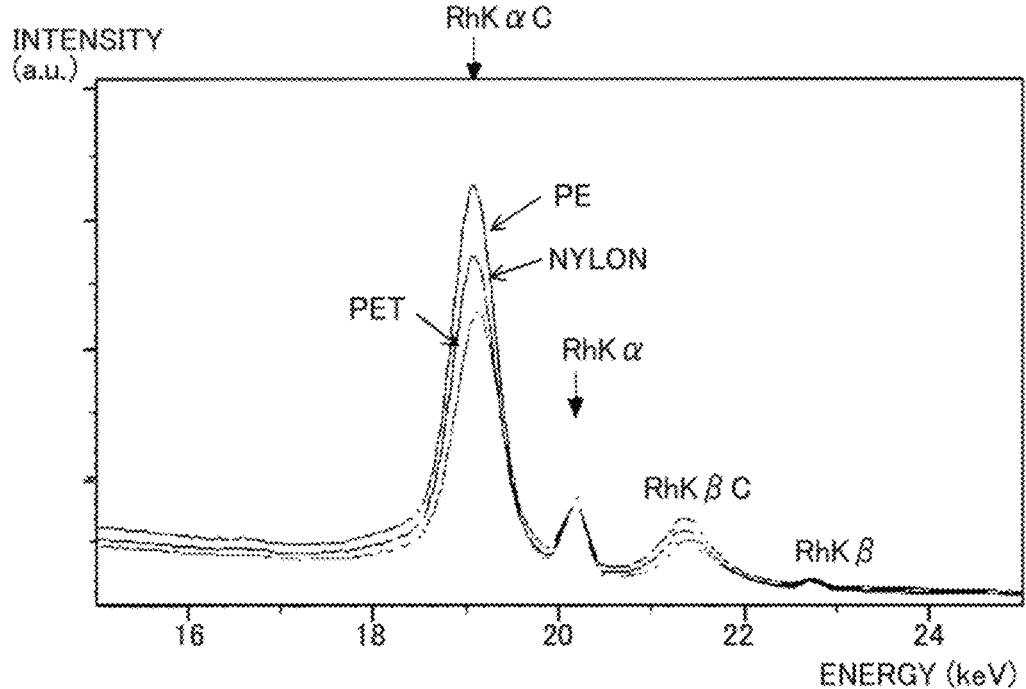
FIG. 4 is a diagram illustrating an X-ray spectrum of X-rays detected by the detector 8 when the excitation X-rays are incident on a sample S.

FIG. 3 is a diagram illustrating an X-ray spectrum of the excitation X-rays emitted from the X-ray tube. FIG. 4 is a diagram illustrating an X-ray spectrum of the X-rays detected by detector 8 when the excitation X-rays are incident on sample S.

As illustrated in FIG. 3, the excitation X-rays emitted from the X-ray tube include continuous X-rays showing no peak and fluorescent X-rays RhKα and RhKβ showing peaks derived from rhodium (Rh) that is a target element of X-ray tube 7.

As illustrated in FIG. 4, in the X-ray spectrum detected by detector 8, there appear peaks of spectral lines of the Compton scattered X-rays RhKαC and the Rayleigh scattered X-rays RhKα derived from the target element of X-ray tube 7.

Although not illustrated in FIG. 4, at a position corresponding to the energy value of the fluorescent X-rays emitted from the elements contained in sample S to be analyzed, there appear spectral lines SKα unique to the elements.

In data processing unit 110, peak extraction unit 112 detects each peak appearing on the X-ray spectrum and extracts peaks of target elements or compounds. Determination unit 113 performs a determination process of types of resins contained in the sample by using intensities of the extracted peaks, in other words, X-ray intensity values. In the present embodiment, when determination unit 113 creates a calibration curve and analyzes a sample using the calibration curve, a confirmation process is executed on the samples placed by a user.

Here, a calibration curve method will be described. In the calibration curve method, a calibration curve representing a relation between an X-ray intensity and an element concentration (or content) is created in advance from the measurement result of a standard sample, and an element concentration is determined from the X-ray intensity value obtained by measuring an unknown sample with reference to the calibration curve.

In general, a plurality of standard samples for a calibration curve is prepared to perform a standard sample analysis for creating the calibration curve. Then, a quantitative analysis of the unknown sample is performed using the created calibration curve.

However, in a case where a calibration curve is created using a plurality of standard samples on the X-ray fluorescence spectrometer, if a user uses an erroneous sample different from a standard sample, an erroneous calibration curve is created, so that a quantitative value of the unknown sample obtained using the calibration curve contains a large error.

In a case where a sample is placed by hand, a measurer easily notices that the sample is the wrong sample. However, in a case where a continuous measurement is performed with a plurality of samples set on a multi-sample exchanger such as a turret, there is a possibility that the wrong sample is measured due to misplacement of the sample.

In order to confirm the samples in that case, the following method can also be considered: a sample observation camera is disposed on a lower surface of the samples; the samples are photographed from the bottom surfaces of the samples before and after the measurement; and the sample images are saved. With the method, it is determined whether the samples are correct, on the basis of the shape, the color, and the like with reference to the sample images. However, in recent years, sensitivity of the X-ray fluorescence spectrometer has been required to be increased, and it is necessary to make smaller a distance between the X-ray tube and a sample, so that it is difficult to secure a space for disposing a sample observation camera.

In such a case, if a calibration curve is created without looking at images and unknown samples are measured without confirmation, it is not possible to notice a misplacement or the like of the samples.

In addition, even if there are sample images from the lower surfaces of the samples, when the samples are liquid samples or white powder samples having different average atomic numbers, the sample images are uniform, and it is difficult to determine, from the images, a difference in the base material and the contents caused by a mistake in placing the standard samples.

In the present embodiment, a description will be given to an X-ray fluorescence spectrometer that can detect an erroneous sample even when there is no sample image by a camera or the like.

With reference to FIGS. 2 to 4, a description will be given on the fluorescent X-rays of rhodium on which the present embodiment is premised.

X-ray tube 7 emits, as illustrated in FIG. 3, excitation X-rays including fluorescent X-rays of rhodium (RhKα) and continuous X-rays.

When the excitation X-rays hit sample S and then bounce back, as illustrated in FIG. 4, a mixture containing the following is detected: RhKα (Rayleigh scattering) whose energy is not lost; RhKαC (Compton scattering) in which part of RhKα has lost energy; and fluorescent X-rays (not illustrated) of an element of the sample. In Compton scattering, energy is determined by a scattering angle θ with respect to sample S. That is, as illustrated in FIG. 4, the difference between the energy of the Rayleigh scattered X-rays and the energy of the Compton scattered X-rays is determined by θ regardless of the base material of sample S.

Therefore, with respect to the Rayleigh scattered X-rays and the Compton scattered X-rays, when the target is rhodium, the energies (the positions on the spectrum) do not change regardless of the base material of the sample and the element to be identified, and the intensities of the peaks change. Since the intensity of the Compton scattered X-rays varies depending on the base material, the base material can be known by detecting the peak of a predetermined spectrum position and see the ratio R. As illustrated in FIG. 4, in the case where the base material is polyethylene (PE), nylon, or polyethylene terephthalate (PET), the intensity of the peak of the Rayleigh scattered X-rays is the same, but the intensity of the peak of the Compton scattered X-rays is different depending on the base material.

That is, when the intensity of the Rayleigh scattered X-rays of the fluorescent X-rays of the tube target is indicated by IR and the intensity of the Compton scattered X-rays is indicated by IC, the ratio R (=IR/IC) varies depending on the base material in accordance with the average atomic number of the sample base material.

For example, in a case where the target is Rh (rhodium), when the average atomic number of the sample base material is smaller (lighter), IR is smaller. In general, a light element base material has a larger IC, and a heavy element base material has a larger IR.

Therefore, by detecting that a sample having a different base material is mixed in the placed standard samples, it is possible to issue a warning before creating a calibration curve or to create a calibration curve by excluding the sample having been mixed in.

FIG. 5 is a flowchart for describing a process, for creating a calibration curve, performed by the control device in the first embodiment. In step S1, control device 14 sets a variable N indicating a standard sample number to 1. Then, in step S2, control device 14 measures an Nth standard sample. The X-ray spectrum at this time is stored in spectrum storage unit 111.

Subsequently, in step S3, control device 14 extracts, in peak extraction unit 112, the intensity IR (N) of the Rayleigh scattered X-rays of the fluorescent X-rays of rhodium, which is the target of the X-ray tube, and the intensity IC (N) of the Compton scattered X-rays from the X-ray spectrum obtained by measuring the Nth sample.

Then, control device 14 calculates, in determination unit 113, the intensity ratio R (=IR/IC) of the Nth standard sample, and determines whether the intensity ratio R is within a reference range (steps S4 and S5). Hereinafter, the reference range set for the intensity ratio R is also referred to as a first reference range.

Figure 6:
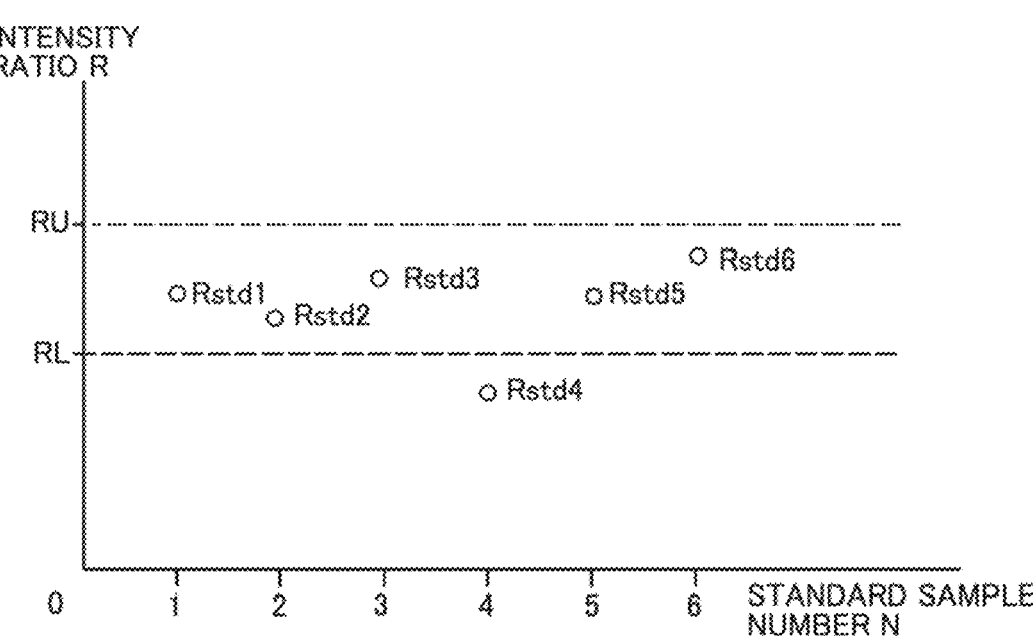
FIG. 6 is a diagram for describing an intensity ratio R and a reference range.

FIG. 6 is a diagram for describing the intensity ratio R and the first reference range. In FIG. 6, the numbers of the standard samples are denoted on the horizontal axis, and the vertical axis represents the intensity ratio R. The intensity ratio between the intensity of the Rayleigh scattered X-rays and the intensity of the Compton scattered X-rays for the tube target in the measurement of each standard sample for the calibration curve is indicated by Rstd(n). The value n represents the numbers of the standard samples (n=1 to 6 when the number of the standard samples is 6).

It is assumed that the intensity ratios Rstd1 to Rstd6 obtained by the measurement are distributed as illustrated in FIG. 6. Here, the first reference range of the intensity ratio R is determined in advance in correspondence to the base material. A lower limit value of the first reference range is indicated by RL, and an upper limit value of the first reference range is indicated by RU. In the example illustrated in FIG. 6, the standard samples of the sample number N=1, 2, 3, 5, 6 indicate the intensity ratio within the first reference range, and the standard sample of the sample number N=4 indicates the intensity ratio outside the first reference range.

In this case, the cause is considered that the sample number N=4 is mixed by a user's mistake.

If the intensity ratio R is determined to be within the first reference range in the case of the sample number N=1, 2, 3, 5, 6 in FIG. 6 (step S5: YES), determination unit 113 determines, in step S6 in FIG. 5, that the standard sample is usable for creating the calibration curve. On the other hand, if the intensity ratio R is determined to be out of the first reference range in the case of the sample number N=4 in FIG. 6 (step S5: NO), determination unit 113 determines, in step S7 in FIG. 5, that the standard sample is not usable for creating the calibration curve, and displays a warning to the user in step S8. For example, a warning message is displayed to notify that there is a possibility of a mistake in placing the standard sample. Note that the warning display in S8 may be collectively displayed after the determinations for the 1st to Nth samples are completed.

After the processing in step S6 or step S8, control device 14 determines whether the sample number N is the last number. If the sample number N is not the last number (step S9: NO), 1 is added to N in step S10, and the process from step S2 is repeated again. On the other hand, if the sample number N is the last number (step S9: YES), control device 14 creates, in step S11, the calibration curve by using the standard samples determined to be usable.

The energy (the position on the spectrum) of the fluorescent X-rays depends on a component to be identified, and the intensity of the peak depends on the concentration. The calibration curve is created to derive a correspondence relation between the intensity and the concentration.

Figure 8:
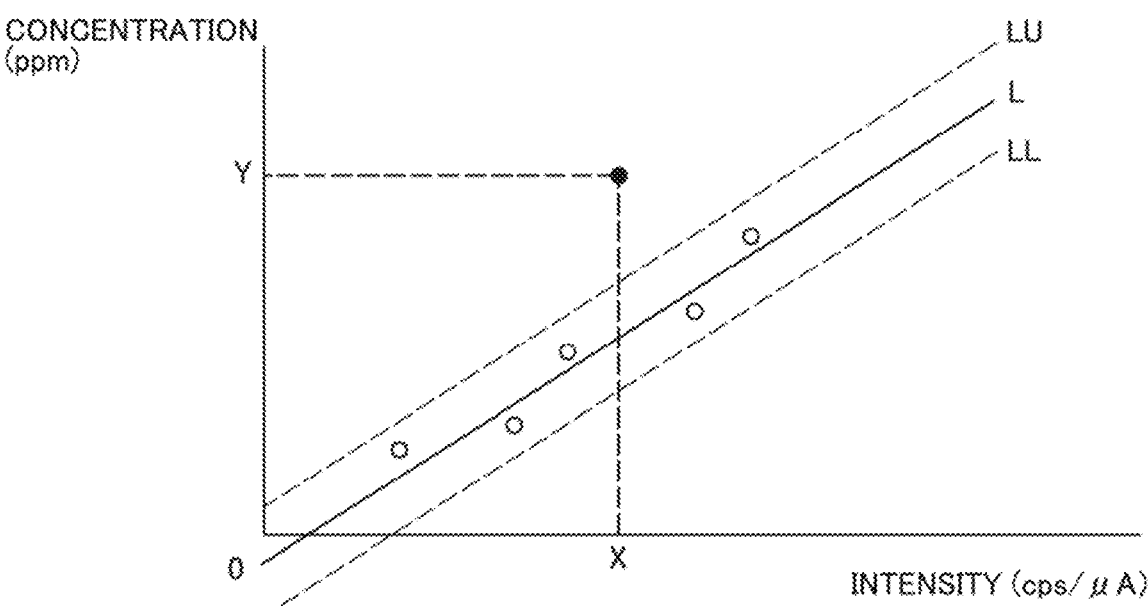
FIG. 8 is a diagram for describing a calibration curve and a reference range of the calibration curve.

Assume as follows: the same base material is, for example, resin A; an analysis target element of an unknown sample to be identified is known in the standard sample; in the standard sample 1, Y1 (ppm) of an analysis target component is mixed in the resin A; and in the standard sample 2, Y2 (ppm) of the analysis target component is mixed in the resin A. In step S11, the X-ray intensities of these analysis target components are actually measured, and a calibration curve is created, on an XY plane as illustrated in FIG. 8, by connecting a plurality of points represented by (X, Y)=(intensity, concentration) by using the least-square method. The peak intensities used at this time are peak intensities of fluorescent X-rays of the analysis target element, which are not illustrated in FIG. 4.

In the above description, the description has been given to the case where the first reference range used in step S5 is determined in advance for the base material, but the first reference range may be determined in a process of measuring the standard samples.

When a standard deviation of the intensity of the Rayleigh scattered X-rays is σIR and a standard deviation of the intensity of the Compton scattered X-rays is σIC, a standard deviation σR of the intensity ratio is derived as follows due to propagation of errors.

When c=a/b, if the errors in a, b, and c are respectively represented by δa, δb, and δc, the following equation (1) is established due to the propagation of the error in the case of division.

[Math. 1]

Math. 1

$$\frac{\delta c}{|c|} \le \frac{\delta a}{|a|} + \frac{\delta b}{|b|} \tag{1}$$

In the above equation (1), when standard deviations of a and b are respectively represented by σa and σb, the following equation (2) is established with respect to the maximum standard deviation σc of c.

$$\sigma c = c \times \left( \sigma a / a + \sigma b / b \right) \tag{2}$$

When the above equation (2) is deformed after the following substitutions are performed: the intensity IR of the Rayleigh scattered X-rays is substituted for a; the standard deviation σIR of the intensity of the Rayleigh scattered X-rays is substituted for σa; the intensity IC of the Compton scattered X-rays is substituted for b; the standard deviation σIC of the intensity of the Compton scattered X-rays is substituted for σb; the intensity ratio R (=IR/IC) of the Rayleigh scattered X-rays and the Compton scattered X-rays is substituted for c; and the standard deviation σR of the intensity ratio R is substituted for σc, the following equation (3) is obtained.

$$\sigma R = R \times \left( \sigma IR / IR + \sigma IC / IC \right) \tag{3}$$

The first reference range to be applied in step S5 can be determined in this manner, using the standard deviation σR of the intensity ratio obtained from the measured standard samples. For example, the reference range can be set to a range of Rave±n×σR (n is a numerical value indicating a width). The value Rave is an average value of the intensity ratios of a plurality of samples, but may be a median value or the like. The above-described σR is an example, and, instead of a standard deviation, a threshold width centered on Rave may be used.

As described above, with the X-ray fluorescence spectrometer of the first embodiment, by detecting that a sample having a different base material is mixed in the placed standard samples, it is possible to issue a warning before creating a calibration curve or to create a calibration curve by excluding the sample having been mixed in.

Second Embodiment

In the first embodiment, it is assumed that a sample having a different base material is mixed in when standard samples are measured to create a calibration curve. However, the following cases may be considered: a case where, although the base material of the standard sample itself is correct, a wrong concentration is input to the X-ray fluorescence spectrometer; and a case where, although the input is correctly performed, the arrangement is erroneously performed. In the second embodiment, a warning can be issued to a user in such cases. Note that the warning of the second embodiment may be performed in combination with the warning of the first embodiment.

FIG. 7 is a flowchart for describing a process, for creating a calibration curve, performed by the control device in the second embodiment. It is assumed that the measurements of the peak intensities of the fluorescent X-rays of the analysis target element of N number of the standard samples, which measurements are performed in step S2 in FIG. 5, are completed before starting a process in FIG. 7. Then, control device 14 determines whether, among the N number of standard samples, there is a sample inappropriate for creating the calibration curve.

First, in step S11, control device 14 sets a variable N indicating a standard sample number to 1. Then, in step S12, control device 14 creates a provisional calibration curve using the standard samples other than the Nth standard sample.

Then, in step S13, control device 14 determines whether the Nth intensity X(N) falls within the reference range with respect to the calibration curve. At this time, the reference range set for the calibration curve is hereinafter also referred to as a second reference range.

FIG. 8 is a diagram for describing the calibration curve and the second reference range. In FIG. 8, the horizontal axis represents the intensity (cps/μA), and the vertical axis represents the concentration (ppm) of the analysis target component.

The calibration curve is calculated in the following method. Measurements are performed on a plurality of standard samples in which the content of the analysis target element is varied with respect to the base material, and the least-square method is applied to the plurality of points. The intensity (cps/μA) on the horizontal axis is a numerical value obtained by dividing the number of counts of the detector 8 per second by a tube current value. Furthermore, the concentration (ppm) of the analysis target component on the vertical axis is a numerical value known in advance for each standard sample, and is input by the user from a keyboard, a data file, or the like when creating the calibration curve.

The number of standard samples for determining the calibration curve only has to be plural, and is often six or the like, but may be two. In a simple case, the calibration curve is sometimes determined using a point of origin and a single point of a standard sample.

The example illustrated in FIG. 8 is an example of a calibration curve of a linear formula. In the case where the content of the element to be measured is low, the intensity increases in proportion to the concentration of the target element, so that a correlation coefficient between the concentration and the intensity is almost 1. As indicated by the black dot in FIG. 8, when a standard sample whose base material is different is measured, the intensity value X is different, and the point deviates from the straight line of the calibration curve created from the standard samples denoted by the five white dots.

The second reference range is defined for the calibration curve created in step S12. In the example of FIG. 8, it is determined, in step S13, whether a registered concentration Y(N) is between an upper limit value LU and lower limit value LL of concentration with respect to a detected intensity X(N). The upper limit value LU and lower limit value LL of concentration may be determined in advance in correspondence to the base material, or the width from the calibration curve may be determined based on the standard deviation as described in the first embodiment.

In step S13, the registered concentration Y(N) is compared with the second reference range; however, it is enough to be able to determine whether the point, in the plane in FIG. 8, indicating the sample is between the two straight lines. Therefore, in step S13, it may be determined whether the intensity X(N) is between an intensity upper limit value and an intensity lower limit value.

If the concentration Y(N) is within the reference range (step S13: YES), control device 14 determines, in step S14, that the Nth standard sample is usable for creating the calibration curve. On the other hand, if the concentration Y(N) is out of the second reference range (step S13: NO), control device 14 determines, in step S15, that the Nth standard sample is not usable for creating the calibration curve, and displays a warning to the user in step S16.

After the processing in step S14 or step S15, control device 14 determines whether the sample number N is the last number. If the sample number N is not the last number (step S17: NO), 1 is added to N in step S18, and the process from step S12 is repeated again. On the other hand, if the sample number N is the last number (step S17: YES), control device 14 creates in step S19, by using the standard samples determined to be usable, a final calibration curve that is used for analyzing an unknown sample.

Even when a plurality of standard samples of the same base material are used, if measurement is performed after a standard sample having a content different from the content previously set in the measurement condition is placed by mistake and if a calibration curve is then created, a correct calibration curve cannot be created. With the X-ray fluorescence spectrometer of the second embodiment, it is possible to detect that a wrong standard sample having a concentration different from a value that should be used and that a concentration of a standard sample is erroneously input, and it is also possible to issue a warning about the detection; therefore, it is possible to prevent creation of a wrong calibration curve.

Third Embodiment

In the first and second embodiments, a warning is issued when there is a problem in the standard sample when creating the calibration curve, but the intensity ratio R used in the first embodiment can also be applied with respect to an error of the unknown sample.

Figure 9:
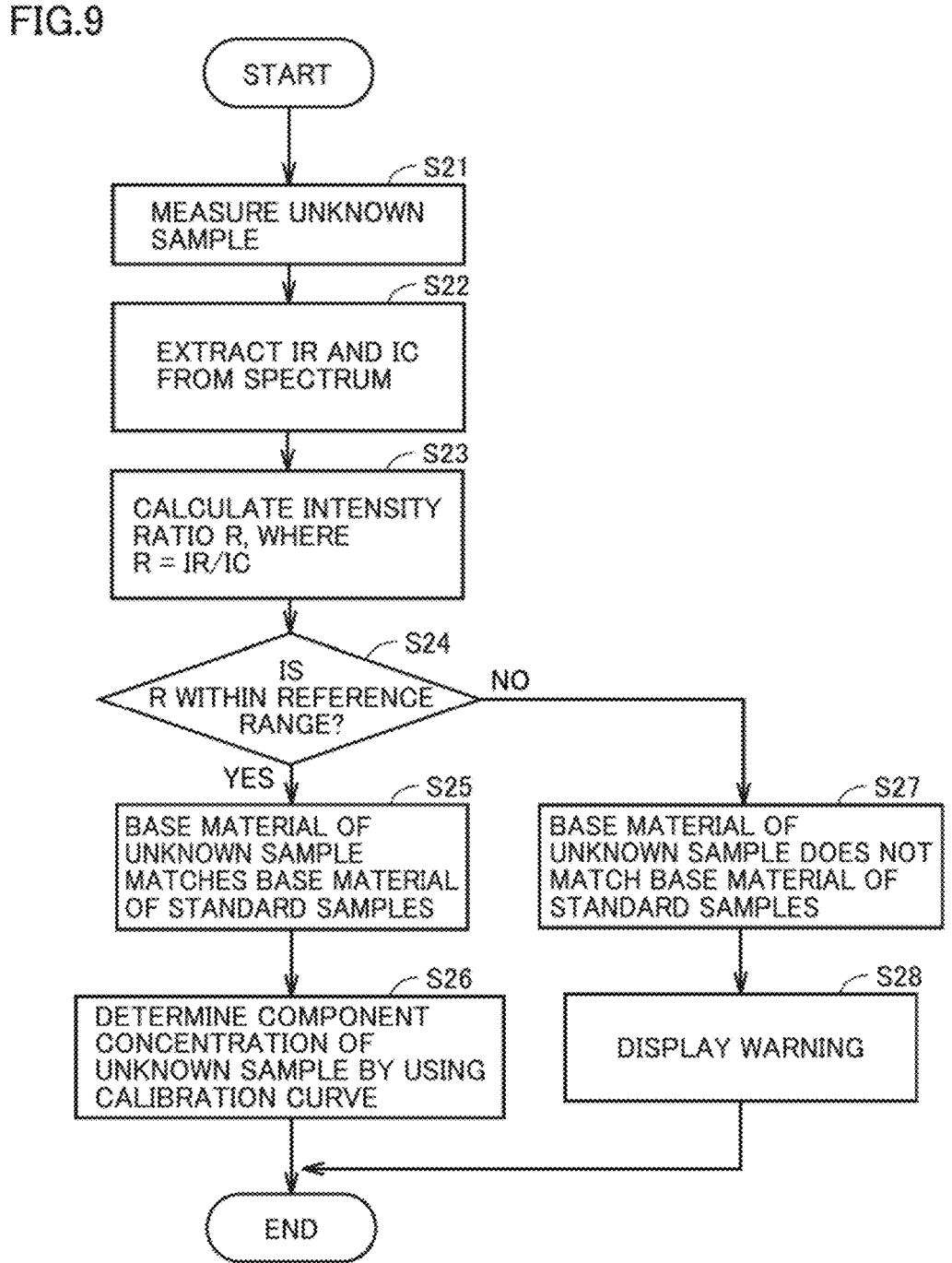
FIG. 9 is a flowchart for describing a process that determines a concentration by using a calibration curve and is performed by the control device in a third embodiment.

FIG. 9 is a flowchart for describing a process that determines a concentration by using a calibration curve and is performed by the control device in a third embodiment.

In step S21, control device 14 measures the X-ray spectrum of an unknown sample. Then, in step S22, control device 14 extracts the intensity IR of the Rayleigh scattered X-rays and the intensity IC of the Compton scattered X-rays of the fluorescent X-rays of rhodium, which is the target of the X-ray tube from the X-ray spectrum obtained by measuring the Nth sample.

Then, control device 14 calculates the intensity ratio R (=IR/IC) of the unknown sample, and determines whether the intensity ratio R falls within the reference range corresponding to the standard samples used to create the calibration curve (steps S23 and S24).

The intensity ratio by the measurement of the unknown sample is represented by Runk(j), and the intensity ratio obtained by the measurement of the standard sample is represented by Rstd (n). The value j represents the number of the unknown sample. The number n represents the number of the standard sample. Usually, the base materials (resin, metal, liquid, and powder) of the standard samples and the unknown samples are often the same, and the values of Runk(j) and Rstd (n) are expected to be almost the same. Therefore, as the reference range used in the determination in step S24, the first reference range used in the determination of the standard samples can be used as it is.

When the intensity ratio R is determined to be within the first reference range (step S24: YES), control device 14 determines that the base material of the unknown sample matches the base material of the standard samples in step S25, and determines, in step S26, the component concentration of the unknown sample by using the calibration curve created in advance by using the standard samples. On the other hand, when the intensity ratio R is determined to be out of the first reference range (step S24: NO), control device 14 determines, in step S27, that the base material of the unknown sample does not match the base material of the standard samples, and displays a warning to the user in step S28.

As described above, with the X-ray fluorescence spectrometer of the third embodiment, when the base material of the unknown sample to be analyzed is different from the base material of the standard samples, a warning message is issued to the user, so that the user can notice the mistake.

[Aspects]

It is understood by those skilled in the art that the exemplary embodiments described above are specific examples of the following aspects.

(Item 1) A first aspect of the present disclosure relates to an X-ray fluorescence spectrometer that analyzes a constituent element of a sample. An X-ray fluorescence spectrometer includes: a sample stage on which the sample is placed; an X-ray tube including a target that emits X-rays when receiving thermal electrons, the X-ray tube radiating, toward the sample stage, excitation X-rays containing fluorescent X-rays of a material of the target; and a detector that detects fluorescent X-rays emitted from the sample on the sample stage; and a control device that controls the X-ray tube and the detector. An intensity of X-rays that are part of the fluorescent X-rays from the target material and are Rayleigh scattered by the sample placed on the sample stage is defined as IR, and an intensity of X-rays that are part of the fluorescent X-rays from the target material and are Compton scattered by the sample placed on the sample stage is defined as IC. The control device is configured to issue a warning when the control device creates a calibration curve by irradiating the standard sample with the excitation X-rays from the X-ray tube and when a value of IR/IC obtained for the standard sample is out of a first reference range. As described above, when the calibration curve is created, the X-ray fluorescence spectrometer detects that the selection of the sample is not appropriate and notifies the user that the selection of the sample is not appropriate, it is possible to avoid a situation in which a measurement error is enlarged.

(Item 2) In the X-ray fluorescence spectrometer according to Item 1, the first reference range is preferably a range determined in advance for a base material of the standard sample, and is stored in the control device.

(Item 3) In the X-ray fluorescence spectrometer according to Item 1, the sample stage preferably includes a plurality of opening portions each of which is provided with an opening, and a sample is allowed to be placed on each of the plurality of opening portions. The control device is configured to create the calibration curve by sequentially irradiating a plurality of standard samples each placed on one of the plurality of opening portions with the excitation X-rays from the X-ray tube.

(Item 4) In the X-ray fluorescence spectrometer according to Item 3, the first reference range is preferably determined based on an average value Rave and a standard deviation σR of IR/IC obtained for each of a plurality of standard samples each placed on one of the plurality of opening portions when the calibration curve is created.

(Item 5) In the X-ray fluorescence spectrometer according to Item 1, after the calibration curve is created, the control device is preferably configured to issue a warning when a value of IR/IC obtained by measuring the sample is out of the first reference range.

(Item 6) In the X-ray fluorescence spectrometer according to Item 1, during a creation of the calibration curve using a plurality of standard samples, the control device is preferably configured to issue a warning when an analysis point is out of a second reference range defined with respect to a provisional calibration curve, the analysis point is obtained by a fluorescent X-ray intensity of an analysis target component and a concentration of the analysis target component, the fluorescent X-ray intensity is obtained by measuring a determination target standard sample, the concentration is registered for the determination target standard sample. The provisional calibration curve is a calibration curve created using the plurality of standard samples or a calibration curve created using a sample obtained by removing the determination target standard sample from the plurality of standard samples.

Note that the configurations described in the embodiments of the present specification may be arbitrarily combined and used.

The X-ray fluorescence spectrometer of the present embodiment can notify, even in a case where there is no sample observation camera, a user of a mistake in placement of a sample or the like on the basis of an analysis of measurement data. The user can notice that there is a mistake in placement without viewing a sample image. Therefore, usability of the X-ray fluorescence spectrometer is improved, and reliability of the measurement data is also improved.

It should be understood that the embodiments disclosed herein are illustrative in all respects and are not restrictive. The scope of the present disclosure is defined not by the above description but by the claims, and is intended to include meanings equivalent to the claims and all modifications within the scope.

REFERENCE SIGNS LIST

1: sample chamber, 2: sample stage, 3: housing, 4, 20: opening portion, 5: measurement chamber, 6: wall surface, 7: X-ray tube, 8: detector, 9: shutter, 10: X-ray fluorescence spectrometer, 11: primary X-ray filter, 12: drive mechanism, 13: collimator, 14: control device, 15: operation unit, 16: output unit, 81: X-ray detector, 82: pre-amplifier, 83: proportional amplifier, 110: data processing unit, 111: spectrum storage unit, 112: peak extraction unit, 113: determination unit, 115: control unit, 141: CPU, 142: memory.

The invention claimed is:

1. An X-ray fluorescence spectrometer that analyzes a constituent element of a sample, the X-ray fluorescence spectrometer comprising:

a sample stage on which the sample is placed;

an X-ray tube including a target that emits X-rays when receiving thermal electrons, the X-ray tube radiating, toward the sample stage, excitation X-rays containing fluorescent X-rays of a material of the target; and a detector that detects fluorescent X-rays emitted from the sample on the sample stage; and a control device that controls the X-ray tube and the detector, wherein an intensity of X-rays that are part of the fluorescent X-rays from the target material and are Rayleigh scattered by the sample placed on the sample stage is defined as IR, an intensity of X-rays that are part of the fluorescent X-rays from the target material and are Compton scattered by the sample placed on the sample stage is defined as IC, and the control device is configured to issue a warning, when the control device creates a calibration curve by irradiating a standard sample with the excitation X-rays from the X-ray tube and when a value of IR/IC obtained for the standard sample is out of a first reference range, wherein the first reference range is a range determined in advance for a base material of the standard sample, and is stored in the control device.

2. An X-ray fluorescence spectrometer that analyzes a constituent element of a sample, the X-ray fluorescence spectrometer comprising:

a sample stage on which the sample is placed;

an X-ray tube including a target that emits X-rays when receiving thermal electrons, the X-ray tube radiating, toward the sample stage, excitation X-rays containing fluorescent X-rays of a material of the target; and a detector that detects fluorescent X-rays emitted from the sample on the sample stage; and a control device that controls the X-ray tube and the detector, wherein an intensity of X-rays that are part of the fluorescent X-rays from the target material and are Rayleigh scattered by the sample placed on the sample stage is defined as IR, an intensity of X-rays that are part of the fluorescent X-rays from the target material and are Compton scattered by the sample placed on the sample stage is defined as IC, and the control device is configured to issue a warning, when the control device creates a calibration curve by irradiating a standard sample with the excitation X-rays from the X-ray tube and when a value of IR/IC obtained for the standard sample is out of a first reference range, wherein the sample stage includes a plurality of opening portions each of which is provided with an opening, and a sample is allowed to be placed on each of the plurality of opening portions, and the control device is configured to create the calibration curve by sequentially irradiating a plurality of standard samples each placed on one of the plurality of opening portions with the excitation X-rays from the X-ray tube.

3. The X-ray fluorescence spectrometer according to claim 2, wherein the first reference range is determined based on an average value and a standard deviation of IR/IC obtained for each of a plurality of standard samples each placed on one of the plurality of opening portions when the calibration curve is created.

4. The X-ray fluorescence spectrometer according to claim 1, wherein, after the calibration curve is created, the control device is configured to issue a warning when a value of IR/IC obtained by measuring the sample is out of the first reference range.

5. An X-ray fluorescence spectrometer that analyzes a constituent element of a sample, the X-ray fluorescence spectrometer comprising:

a sample stage on which the sample is placed;

an X-ray tube including a target that emits X-rays when receiving thermal electrons, the X-ray tube radiating, toward the sample stage, excitation X-rays containing fluorescent X-rays of a material of the target; and a detector that detects fluorescent X-rays emitted from the sample on the sample stage; and a control device that controls the X-ray tube and the detector, wherein an intensity of X-rays that are part of the fluorescent X-rays from the target material and are Rayleigh scattered by the sample placed on the sample stage is defined as IR, an intensity of X-rays that are part of the fluorescent X-rays from the target material and are Compton scattered by the sample placed on the sample stage is defined as IC, and the control device is configured to issue a warning, when the control device creates a calibration curve by irradiating a standard sample with the excitation X-rays from the X-ray tube and when a value of IR/IC obtained for the standard sample is out of a first reference range, wherein, during a creation of the calibration curve using a plurality of standard samples, the control device is configured to issue a warning when an analysis point is out of a second reference range defined with respect to a provisional calibration curve, the analysis point being obtained by a fluorescent X-ray intensity of an analysis target component and a concentration of the analysis target component, the fluorescent X-ray intensity being obtained by measuring a determination target standard sample, the concentration being registered for the determination target standard sample, and the provisional calibration curve is a calibration curve created using the plurality of standard samples or a calibration curve created using a sample obtained by removing the determination target standard sample from the plurality of standard samples.

* * * * *